US011659121B2

(12) United States Patent
Ishikawa

(10) Patent No.: US 11,659,121 B2
(45) Date of Patent: May 23, 2023

(54) IMAGE FORMING SYSTEM THAT DISPLAYS OPERATION INFORMATION

(71) Applicant: KYOCERA Document Solutions Inc., Osaka (JP)

(72) Inventor: Suguru Ishikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/723,548

(22) Filed: Apr. 19, 2022

(65) Prior Publication Data

US 2022/0337720 A1    Oct. 20, 2022

(30) Foreign Application Priority Data

Apr. 20, 2021   (JP) .............................. JP2021-071120

(51) Int. Cl.
*H04N 1/00*         (2006.01)

(52) U.S. Cl.
CPC ....... *H04N 1/00973* (2013.01); *H04N 1/0097* (2013.01); *H04N 1/00204* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 2013/0070291 | A1* | 3/2013 | Nishizaki | G06F 3/1253 |
| | | | | 358/1.15 |
| 2015/0269266 | A1* | 9/2015 | Kuroda | G06F 16/957 |
| | | | | 715/234 |
| 2017/0064105 | A1* | 3/2017 | Iwase | H04N 1/00973 |
| 2019/0191039 | A1* | 6/2019 | Kumagai | H04N 1/00167 |
| 2020/0028983 | A1* | 1/2020 | Saito | H04N 1/00474 |
| 2020/0137245 | A1* | 4/2020 | Hamamoto | H04N 1/00517 |
| 2020/0251032 | A1* | 8/2020 | Nakamura | G06F 11/2221 |

FOREIGN PATENT DOCUMENTS

| | | | |
|---|---|---|---|
| JP | 2015-118437 A | | 6/2015 |
| JP | 2015118437 A | * | 6/2015 |

* cited by examiner

*Primary Examiner* — Henok Shiferaw
(74) *Attorney, Agent, or Firm* — Studebaker & Brackett PC

(57) ABSTRACT

An image forming apparatus includes a first storage that stores therein operation flow information indicating an operation flow in the image forming apparatus. An information processing device includes a second storage, a second display section, and a second input section. The second storage stores therein operation manual information indicating an operation manual for the image forming apparatus. The second display section displays the operation manual in accordance with the operation manual information. The second display section displays the operation flow in accordance with the operation flow information when an execution button on the operation manual displayed on the second display section is operated through the second input section.

2 Claims, 7 Drawing Sheets

IMAGE FORMING SYSTEM THAT DISPLAYS OPERATION INFORMATION

INCORPORATION BY REFERENCE

The present application claims priority under 35 U.S.C. § 119 to Japanese Patent Application No. 2021-071120, filed on Apr. 20, 2021. The contents of this application are incorporated herein by reference in their entirety.

BACKGROUND

The present disclosure relates to an image forming system.

In general, operation of an image forming apparatus such as a multifunction peripheral is complicated, and therefore an operation manual prepared therefor is available. If this is the case, even a user who is not proficient in operating the image forming apparatus can appropriately use the image forming apparatus by operating the image forming apparatus in accordance with the operation manual.

In general, an image forming apparatus is sometimes operated remotely while being connected to a network. It has been therefore contemplated to display an operation manual for the image forming apparatus on a display section of a device such as a personal computer connected to the image forming apparatus via the network. In a general image forming system, selecting a portion describing a given function on the operation manual displayed on the display section is followed by an operation screen being displayed for configuring settings for this function, facilitating setting of functions described in the operation manual.

SUMMARY

An image forming system according to an aspect of the present disclosure includes an image forming apparatus and an information processing device that communicates with the image forming apparatus. The image forming apparatus includes an image forming section, a first storage, a first display section, a first input section, a first communication section, and a first controller. The image forming section forms an image on a sheet. The first storage stores therein operation flow information indicating an operation flow in the image forming apparatus. The first display section displays the operation flow in accordance with the operation flow information. The first controller controls the image forming section, the first storage, the first display section, the first input section, and the first communication section. The information processing device includes a second communication section, a second display section, a second input section, a second storage, and a second controller. The second communication section communicates with the first communication section. The second storage stores therein operation manual information indicating an operation manual for the image forming apparatus. The second controller controls the second communication section, the second display section, the second input section, and the second storage. The second display section displays the operation manual in accordance with the operation manual information. The second display section displays the operation flow in accordance with the operation flow information when an execution button on the operation manual displayed on the second display section is operated through the second input section.

DETAILED DESCRIPTION

Figure 1:
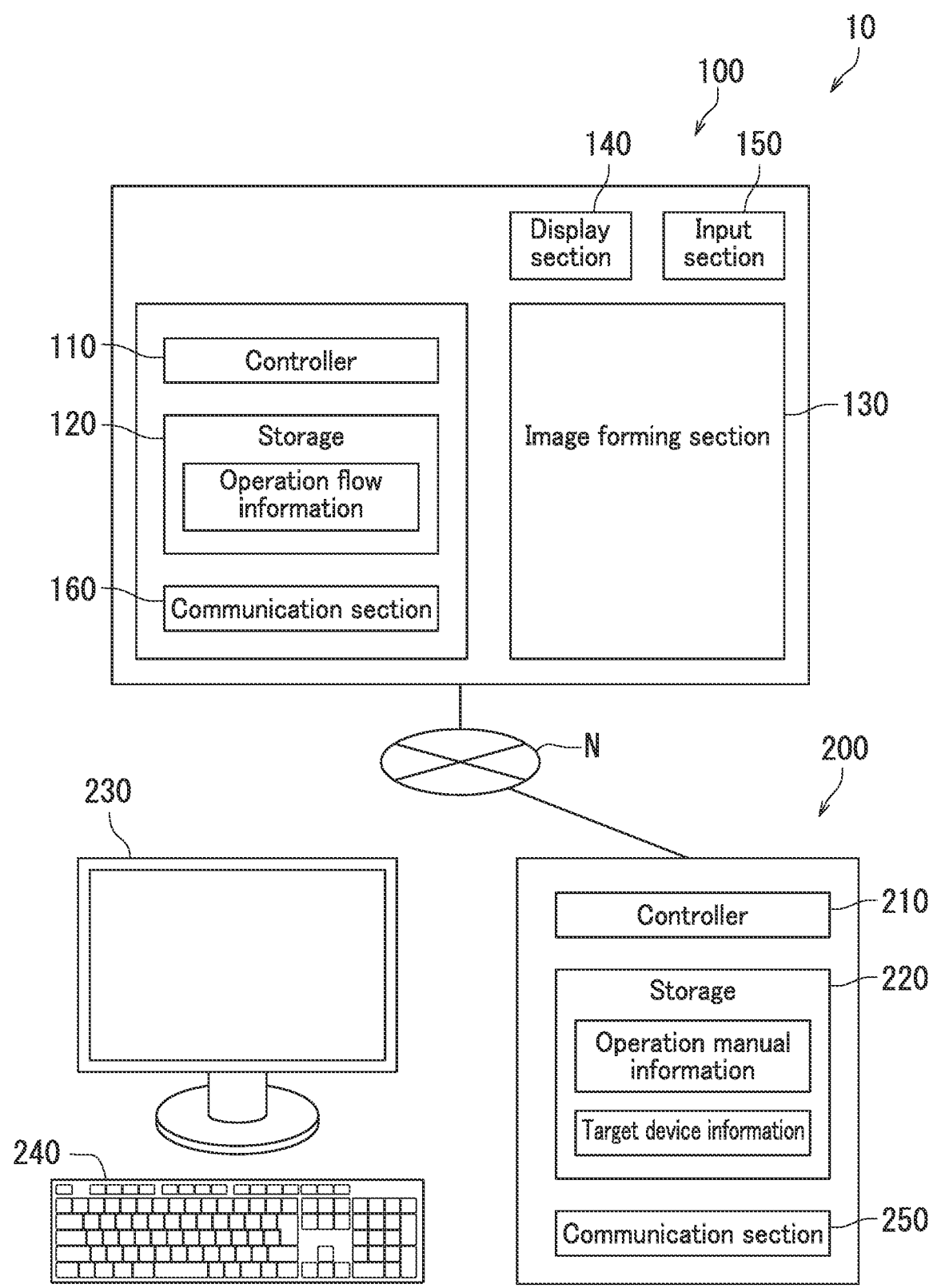
FIG. 1 is a schematic block diagram of an image forming system according to an embodiment of the present disclosure.

The following describes an image forming system according to an embodiment of the present disclosure with reference to the accompanying drawings. Note that elements that are the same or equivalent are indicated by the same reference signs in the drawings and description thereof is not repeated.

First, a configuration of an image forming system 10 according to the present embodiment will be described with reference to FIG. 1. FIG. 1 is a schematic block diagram of the image forming system 10.

As illustrated in FIG. 1, the image forming system 10 includes an image forming apparatus 100 and an information processing device 200. The image forming apparatus 100 forms an image on a sheet. The image forming apparatus 100 is, for example, a printer, a copier, or a multifunction peripheral. The image forming apparatus 100 may have a facsimile function. The image forming apparatus 100 may be an electrophotographic image forming apparatus or an inkjet image forming apparatus.

The information processing device 200 processes information for driving the image forming apparatus 100. The information processing device 200 is enabled to communicate with the image forming apparatus 100. The information processing device 200 may be a so-called personal computer (PC) or a tablet.

The information processing device 200 is connected to the image forming apparatus 100 via a network N. The network N may be the Internet. The network N may alternatively be a wide area network (WAN) or a local area network (LAN).

The image forming apparatus 100 includes a controller 110, a storage 120, an image forming section 130, a display section 140, an input section 150, and a communication section 160. The controller 110 controls the storage 120, the image forming section 130, the display section 140, the input section 150, and the communication section 160.

The controller 110 includes a computing device. The computing device includes a processor. The processor includes, for example, a central processing unit (CPU).

The storage 120 stores therein data and a computer program. The storage 120 includes memory devices. The storage 120 includes a main memory device such as semiconductor memory and an auxiliary memory device such as semiconductor memory or a hard disk drive. The storage 120 may include a removable medium. The processor of the controller 110 executes the computer program stored in a memory device of the storage 120 to control elements of the image forming apparatus 100.

The computer program is, for example, stored on a non-transitory computer-readable storage medium. Examples of usable non-transitory computer-readable media include read only memory (ROM), random access memory (RAM), CD-ROM, a magnetic tape, a magnetic disk, and an optical data storage device.

The storage 120 stores therein image information indicating an image to be formed on a sheet.

The storage 120 also stores operation flow information. The operation flow information indicates a flow of various operations in the image forming apparatus 100.

The storage 120 further stores home screen information. The home screen information indicates an image to be displayed as a home screen on the display section 140.

The image forming section 130 forms an image on a sheet in accordance with the image information. The image forming section 130 may form the image on a sheet using a toner. Alternatively, the image forming section 130 may form the image on a sheet using an ink.

The display section 140 displays an image in accordance with the image information. This allows an operator of the image forming apparatus 100 to see the image information before the image forming section 130 forms the image on a sheet.

The display section 140 also displays an operation flow in accordance with the operation flow information. Typically, the size of the display section 140 in the image forming apparatus 100 is relatively small. The operation flow is therefore presented using diagrams and/or animations that schematically represent the image forming apparatus 100 and necessary operations.

The display section 140 also displays a home screen in accordance with the home screen information. Typically, the operation flow starts being displayed when a specific button on the home screen is operated.

The display section 140 includes a liquid crystal display (LCD), an organic electroluminescence (EL) display, or a plasma display.

The input section 150 is used to input the operator's instructions. The operator can operate a screen displayed on the display section 140 using the input section 150.

The input section 150 includes buttons or a keyboard. Alternatively, the input section 150 may include a touch sensor. The display section 140 and the input section 150 may be integrated and provided as a touch panel.

The communication section 160 communicates with an external device. For example, the communication section 160 receives image information from the external device. The communication section 160 also receives an operation signal from the external device. Upon the communication section 160 receiving an operation signal from the external device, the controller 110 operates in accordance with an instruction indicated by the operation signal. The communication section 160 then transmits information to the external device as needed.

In the present embodiment, the communication section 160 communicates with the information processing device 200. For example, the communication section 160 receives image information from the information processing device 200. The communication section 160 also receives an operation signal from the information processing device 200. Upon the communication section 160 receiving an operation signal from the information processing device 200, the controller 110 operates in accordance with an instruction indicated by the operation signal. The communication section 160 then transmits information to the information processing device 200 as needed.

The information processing device 200 includes a controller 210, a storage 220, a display section 230, an input section 240, and a communication section 250. The controller 210 controls the storage 220, the display section 230, the input section 240, and the communication section 250.

In this specification, the controller 110, the storage 120, the display section 140, the input section 150, and the communication section 160 of the image forming apparatus 100 may be respectively referred to as a first controller 110, a first storage 120, a first display section 140, a first input section 150, and a first communication section 160. Likewise, the controller 210, the storage 220, the display section 230, the input section 240, and the communication section 250 of the information processing device 200 may be respectively referred to as a second controller 210, a second storage 220, a second display section 230, a second input section 240, and a second communication section 250.

The controller 210 includes a computing device. The computing device includes a processor. The processor includes, for example, a central processing unit (CPU).

The storage 220 stores therein data and a computer program. The storage 220 includes memory devices. The storage 220 includes a main memory device such as semiconductor memory and an auxiliary memory device such as semiconductor memory or a hard disk drive. The storage 220 may include a removable medium. The processor of the controller 210 executes the computer program stored in a memory device of the storage 220 to control elements of the information processing device 200.

The computer program is, for example, stored on a non-transitory computer-readable storage medium. Examples of usable non-transitory computer-readable media include ROM, RAM, CD-ROM, a magnetic tape, a magnetic disk, and an optical data storage device.

The storage 220 stores therein image information indicating an image. The image information is, for example, created through the input section 240.

The storage 220 also stores operation manual information. The storage 220 stores operation manual information indicating an operation manual for the image forming apparatus 100. The storage 220 may store operation manual information indicating an operation manual for the image forming apparatus 100 identified as an image forming apparatus corresponding to a printer driver installed on the information processing device 200.

The storage 220 may also store target device information indicating a target device to which the image information is transmitted in order to form the image on a sheet. Typically, the target device information identifies the image forming apparatus 100 corresponding to the printer driver installed on the information processing device 200. The target device information may be an IP address of the target device.

The display section 230 displays an image in accordance with the image information. This allows an operator of the information processing device 200 to see the image information before transmitting the image information to the image forming apparatus 100.

The display section 230 also displays an operation manual in accordance with the operation manual information. Typically, the size of the display section 230 in the information processing device 200 is relatively large. The operation manual is therefore presented using a number of characters.

The display section 230 includes a liquid crystal display (LCD), an organic EL display, or a plasma display.

The input section 240 is used to input the operator's instructions. The operator can operate a screen displayed on the display section 230 using the input section 240.

The input section 240 includes buttons or a keyboard. Alternatively, the input section 240 may include a touch sensor. The display section 230 and the input section 240 may be integrated and provided as a touch panel.

The communication section 250 communicates with an external device. For example, the communication section 250 communicates with the image forming apparatus 100.

Figure 2:
FIGS. 2 to 5 are each a schematic diagram of a display screen displayed on a display section of an information processing device in the image forming system according to the embodiment.
Figure 3:
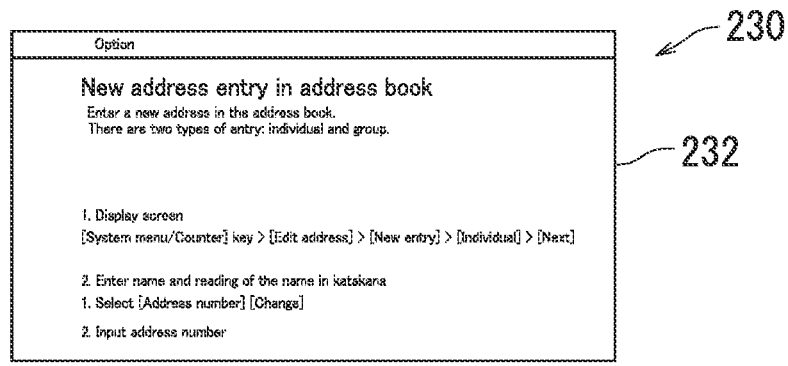

Next, the configuration of the image forming system 10 according to the present embodiment will be described with reference to FIGS. 1 to 3. FIGS. 2 to 9 are each a schematic diagram of a display screen 232 on the display section 230 of the information processing device 200 in the image forming system 10.

As illustrated in FIG. 2, the display section 230 displays a home screen of the information processing device 200 as the display screen 232. In FIG. 2, an icon M for displaying the operation manual for the image forming apparatus 100 is displayed on the home screen of the information processing device 200. For example, an icon M indicating a shortcut to the operation manual is displayed on the display screen 232. In response to the icon M being selected through the input section 240, the display section 230 displays the operation manual for the image forming apparatus 100.

As illustrated in FIG. 3, the display screen 232 on the display section 230 shows the operation manual for the image forming apparatus 100. The operation manual is displayed in accordance with the operation manual information stored in the storage 220 of the information processing device 200. The operation manual in FIG. 3 is regarding new address entry in an address book.

Figure 4:
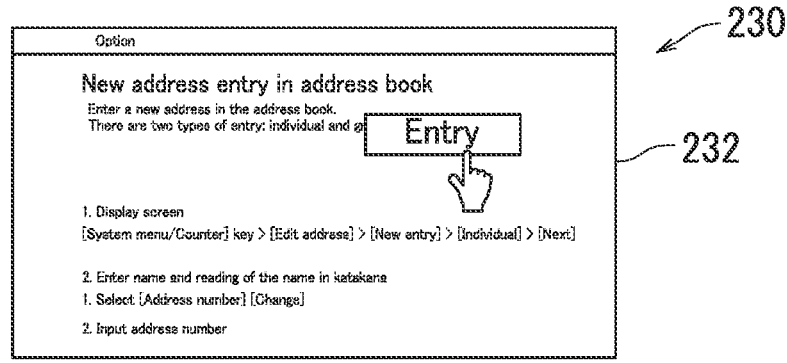

As illustrated in FIG. 4, the operation manual displayed on the display screen 232 has thereon an execution button set in a specific area. FIG. 4 shows an entry button as an example of the execution button. In response to the execution button being selected, an operation execution mode starts to enable execution of an actual operation on the image forming apparatus 100.

The operation execution mode starts in response to the execution button being selected. Specifically, the second communication section 250 of the information processing device 200 starts communicating with the first communication section 160 of the image forming apparatus 100 to receive, from the storage 120 of the image forming apparatus 100, the home screen information to be displayed on the first display section 140 and receive, from the storage 120 of the image forming apparatus 100, the operation flow information indicating an operation flow regarding operations described in the operation manual. The second communication section 250 may receive the home screen information and the operation flow information simultaneously through the first communication section 160. Alternatively, the second communication section 250 may receive the home screen information and the operation flow information separately through the first communication section 160.

Figure 5:
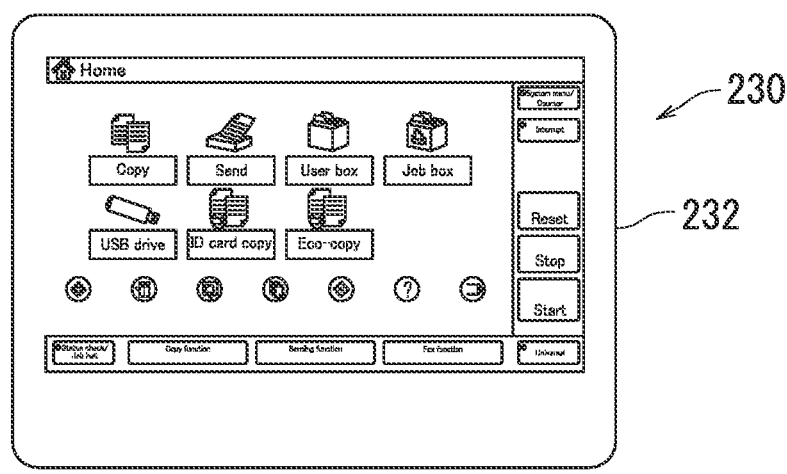
Figure 6:
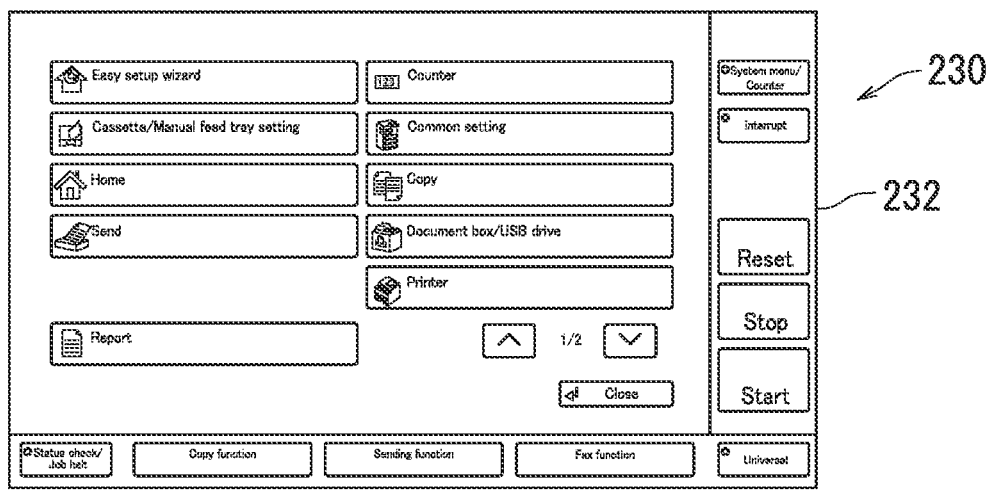
FIGS. 6 to 9 are each a schematic diagram of a display screen displayed on the display section of the information processing device in the image forming system according to the embodiment.
Figure 7:
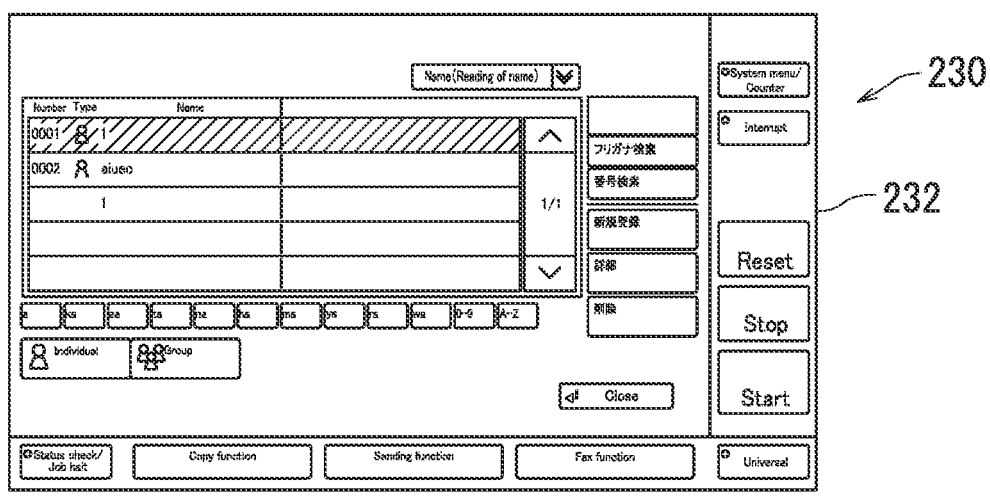
Figure 8:
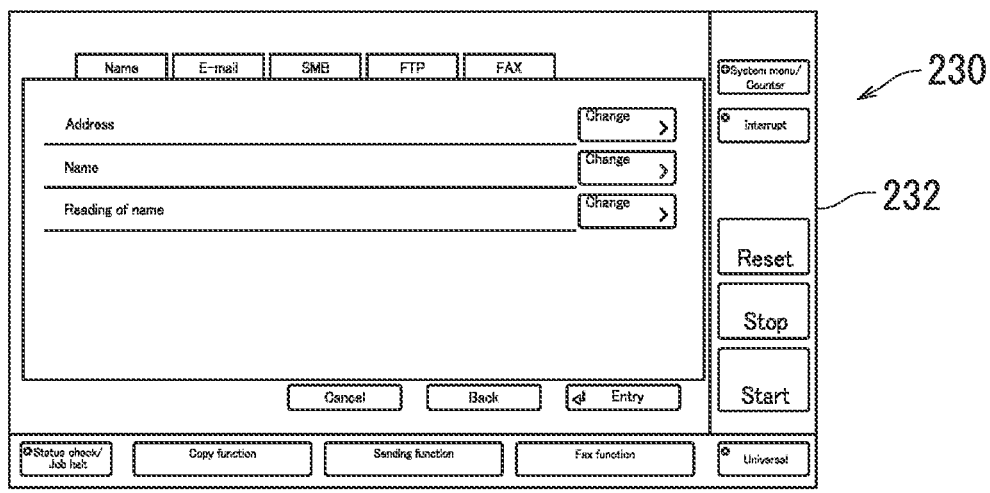
Figure 9:
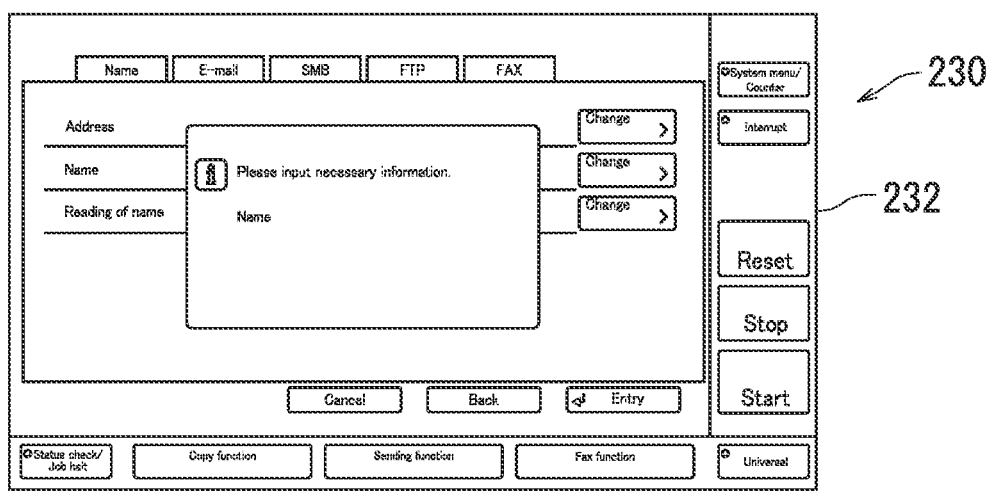

As illustrated in FIG. 5, the second display section 230 of the information processing device 200 displays the home screen of the image forming apparatus 100 in accordance with the home screen information.

Subsequently, as illustrated in FIGS. 6 to 9, the second display section 230 displays the operation flow in the image forming apparatus 100. The operation flow in FIGS. 6 to 9 is regarding new address entry in an address book. The operation flow automatically transitions from screen to screen except when the operator inputs a necessary operation. For example, the operator enters the name of a person to be included in the address book, and then enters an address of the person on the display screen 232 shown in FIG. 7.

Once the operator has inputted the name and the address of the person on the second display section 230 through the second input section 240, the thus inputted information is transmitted from the second communication section 250 to the first communication section 160, and then entered in the first storage 120.

As described above, according to the present embodiment, it is possible to operate the image forming apparatus 100 in accordance with an operation flow from a location remote from the image forming apparatus 100.

In a case where the operator of the information processing device 200 makes an faulty input through the second input section 240, the image forming apparatus 100 fails to accept the operation performed by the operator. In this case, the information processing device 200 may receive an error code indicating an operation error from the image forming apparatus 100 and acquire a description of this error code from the operation manual information to cause the second display section 230 to display the description of the error code in the operation manual.

Figure 10:
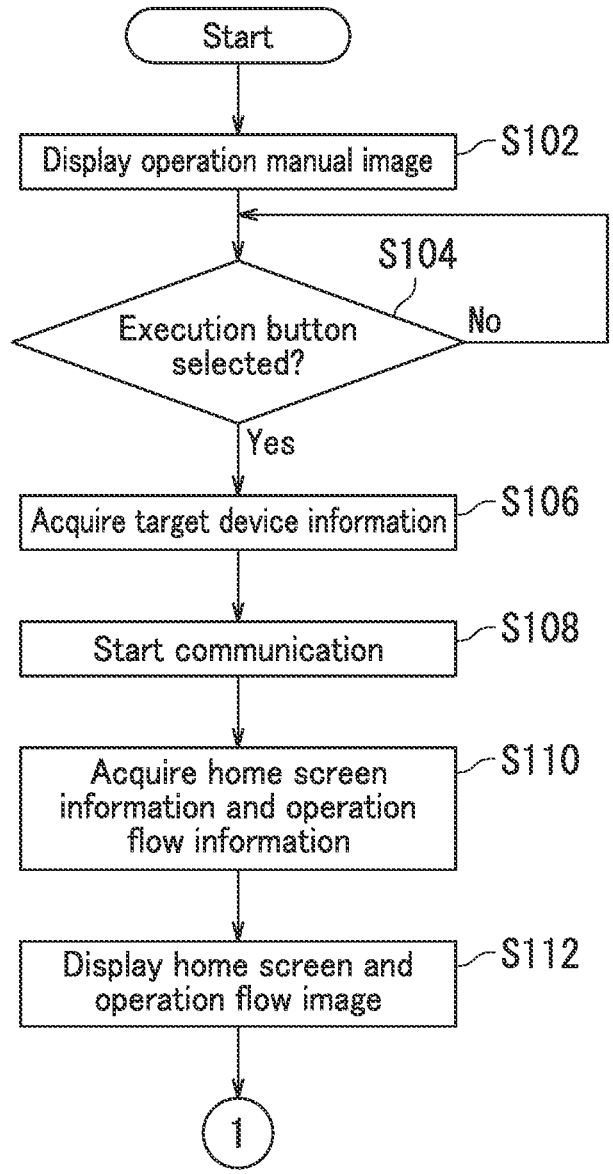
FIG. 10 is a flowchart showing operation of the information processing device in the image forming system according to the embodiment.
Figure 11:
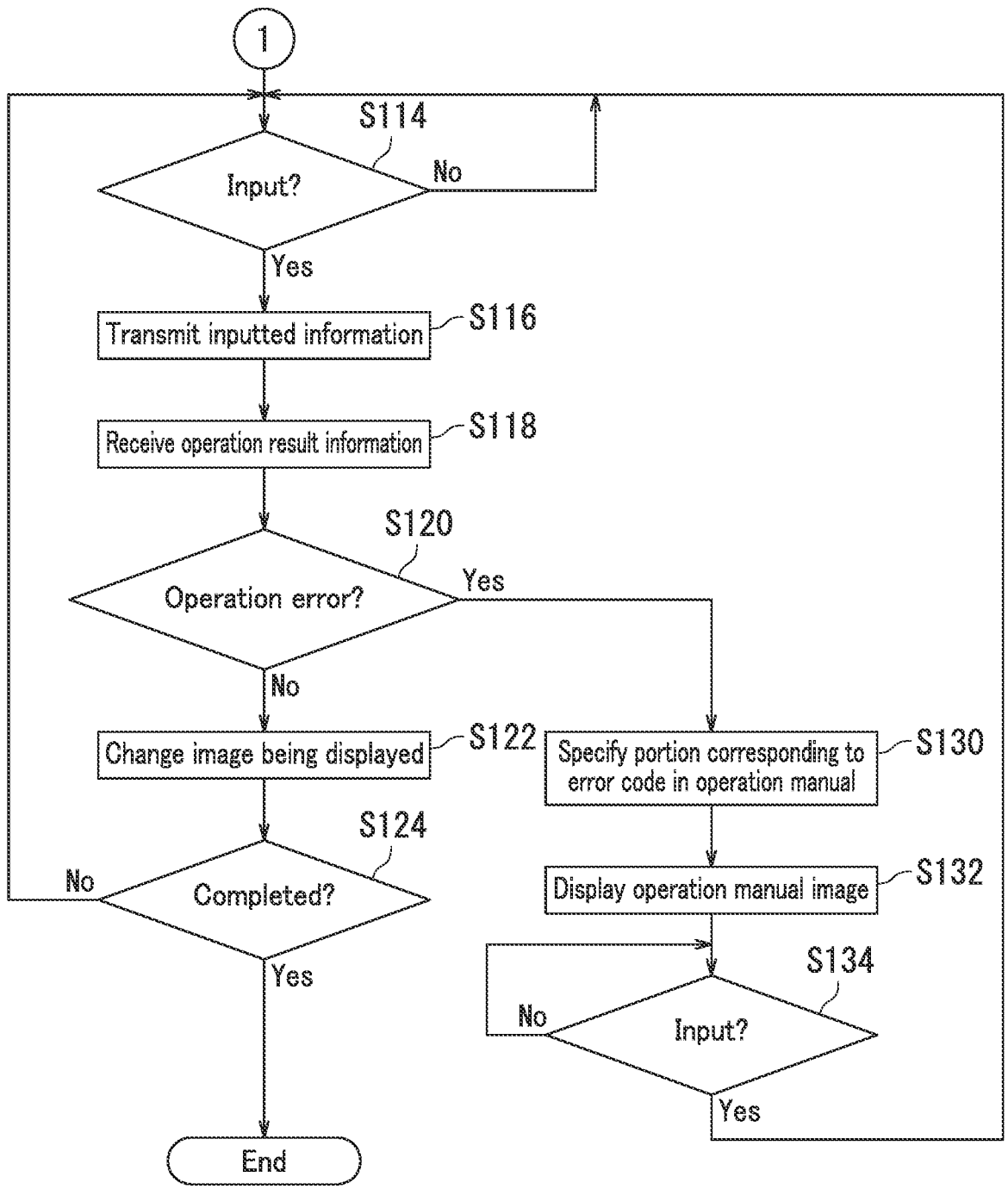
FIG. 11 is a flowchart showing the operation of the information processing device in the image forming system according to the embodiment.

Next, the configuration of the image forming system 10 according to the present embodiment will be described with reference to FIGS. 1 to 11. FIGS. 10 and 11 are each a flow chart showing operation of the information processing device 200 in the image forming system 10.

In Step S102, an operation manual is displayed. The controller 210 controls the display section 230 to cause the display section 230 to display the operation manual according to the operation manual information stored in the storage 220.

In Step S104, the information processing device 200 determines whether or not the execution button has been selected on a display screen showing the operation manual. For example, the information processing device 200 determines whether or not the execution button has been selected through the input section 240. Upon a determination that the execution button has not been selected (No in Step S104), the process returns to Step S102, and the operation manual is kept displayed. Upon a determination that the execution button has been selected (Yes in Step S104), the process continues to Step S106.

In Step S106, the target device information is acquired. Specifically, the controller 210 acquires, from the storage 220, the target device information indicating the image forming apparatus 100 to perform image formation with.

In Step S108, the information processing device 200 starts communicating with the image forming apparatus 100 identified as the target device.

In Step S110, the information processing device 200 acquires the home screen information and the operation flow information from the image forming apparatus 100. The second communication section 250 receives the home screen information and the operation flow information from the first communication section 160.

In Step S112, the display section 230 displays the home screen and an operation flow image in accordance with the home screen information and the operation flow information.

In Step S114, the information processing device 200 determines whether or not information has been inputted on the display screen 232. For example, the information processing device 200 determines whether or not information has been inputted on the display screen 232 through the input section 240. Upon a determination that no information has been inputted (No in Step S114), the process returns to Step S114, and the operation flow image is kept displayed. Upon a determination that information has been inputted (Yes in Step S114), the process continues to Step S116.

In Step S116, the second communication section 250 transmits the inputted information to the first communication section 160.

In Step S118, the second communication section 250 receives, from the first communication section 160, operation result information indicating a result of an operation performed on the inputted information in the image forming apparatus 100.

In Step S120, the information processing device 200 determines whether or not the operation result information includes an error code. The operation result information includes an error code when the information inputted through the input section 240 is inaccurate. Upon a determination that the operation result information does not include an error code (No in Step S120), the process continues to Step S122. Upon a determination that the operation result information includes an error code (Yes in Step S120), the process continues to Step S130.

In Step S122, the second controller 210 changes the operation flow image to be displayed on the display section 230 in accordance with the operation result information.

In Step S124, the information processing device 200 determines whether or not an operation along the operation flow image has been completed. Upon a determination that the operation has not been completed (No in Step S124), the process returns to Step S114, and the operation flow image is kept displayed. Upon a determination that the operation has been completed (Yes in Step S124), the process ends.

In Step S130, the second controller 210 specifies a portion corresponding to the error code in the operation manual information.

In Step S132, the second controller 210 causes the display section 230 to display the operation manual information, i.e., the portion specified in the operation manual information.

In Step S134, the information processing device 200 determines whether or not information has been inputted on the display screen 232. For example, the information processing device 200 determines whether or not information has been inputted on the display screen 232 through the input section 240. Upon a determination that no information has been inputted (No in Step S134), the process returns to Step S134, and the operation manual information is kept displayed. Upon a determination that information has been inputted (Yes in Step S134), the display section 230 switches to displaying the operation flow image, and the process returns to Step S114.

As described above, according to the present embodiment, it is possible to operate the image forming apparatus 100 in accordance with an operation flow from a location remote from the image forming apparatus 100.

Note that the image forming apparatus 100 can be shared by an unspecified number of people. The image forming apparatus 100 is therefore likely to malfunction when an operator operates the image forming apparatus 100 in the operation execution mode using the information processing device 200 at a location remote from the image forming apparatus 100 while another operator is inputting an operation to the image forming apparatus 100 through the first input section 150 of the image forming apparatus 100. To avoid such a consequence, entry in the image forming apparatus 100 in the operation execution mode directed using the information processing device 200 while an operation is being inputted to the image forming apparatus 100 through the first input section 150 may be cancelled or may be executed after the operation being inputted through the first input section 150 has been completed. Needless to say, the entry in the image forming apparatus 100 in the operation execution mode directed using the information processing device 200 may be executed by interrupting the operation being inputted through the first input section 150.

Through the above, embodiments of the present disclosure have been described with reference to the drawings. However, the present disclosure is not limited to the foregoing embodiments and may be implemented in various different forms that do not deviate from the essence of the present disclosure. Also, a plurality of elements of configuration disclosed in the foregoing embodiments can be combined as appropriate to form various disclosures. For example, some of the elements of configuration disclosed in the embodiments may be omitted. For another example, some of the elements of configuration from different embodiments may be combined as appropriate. The drawings schematically illustrate elements of configuration in order to facilitate understanding, and properties of the elements of configuration illustrated in the drawings, such as thickness, length, number, and spacing thereof, may differ from actual properties thereof in order to facilitate preparation of the drawings. Furthermore, properties of the elements of configuration described in the foregoing embodiments, such as material, shape, and dimensions thereof, are merely examples and are not intended as specific limitations, and can be altered in various ways to the extent that there is not substantial deviation from the effects of the present disclosure.

What is claimed is:

1. An image forming system comprising:
an image forming apparatus; and
an information processing device configured to communicate with the image forming apparatus,
the image forming apparatus including
an image forming section configured to form an image on a sheet,
a first storage configured to store therein operation flow information indicating an operation flow in the image forming apparatus,
a first display section configured to display the operation flow in accordance with the operation flow information,
a first input section,
a first communication section, and
a first controller configured to control the image forming section, the first storage, the first display section, the first input section, and the first communication section,
the information processing device including
a second communication section configured to communicate with the first communication section,
a second display section,
a second input section,
a second storage configured to store therein operation manual information indicating an operation manual for the image forming apparatus, and
a second controller configured to control the second communication section, the second display section, the second input section, and the second storage,
wherein
the second display section displays the operation manual in accordance with the operation manual information, and the second display section displays the operation flow in accordance with the operation flow information when an execution button on the operation manual displayed on the second display section is operated through the second input section, and the first communication section transmits the operation flow information to the second communication section when the execution button on the operation manual displayed on the second display section is operated through the second input section.

2. An image forming system comprising:

an image forming apparatus; and an information processing device configured to communicate with the image forming apparatus, the image forming apparatus including an image forming section configured to form an image on a sheet, a first storage configured to store therein operation flow information indicating an operation flow in the image forming apparatus, a first display section configured to display the operation flow in accordance with the operation flow information, a first input section, a first communication section, and a first controller configured to control the image forming section, the first storage, the first display section, the first input section, and the first communication section, the information processing device including a second communication section configured to communicate with the first communication section, a second display section, a second input section, a second storage configured to store therein operation manual information indicating an operation manual for the image forming apparatus, and a second controller configured to control the second communication section, the second display section, the second input section, and the second storage, wherein the second display section displays the operation manual in accordance with the operation manual information, and the second display section displays the operation flow in accordance with the operation flow information when an execution button on the operation manual displayed on the second display section is operated through the second input section, the second storage stores therein target device information indicating the image forming apparatus, and the second controller reads the target device information out of the second storage and controls the second communication section to cause the second communication section to communicate with the image forming apparatus indicated by the target device information.

\* \* \* \* \*